Sept. 4, 1934.　　　　I. H. KENDALL　　　　1,972,711

APPARATUS FOR WASHING RECEPTACLES

Filed Jan. 24, 1928　　　11 Sheets-Sheet 1

INVENTOR
Ira H. Kendall
BY Mock & Blum
ATTORNEYS

Sept. 4, 1934.        I. H. KENDALL        1,972,711
APPARATUS FOR WASHING RECEPTACLES
Filed Jan. 24, 1928        11 Sheets-Sheet 2

INVENTOR
Ira H. Kendall
BY
Mock & Blum
ATTORNEYS

Sept. 4, 1934.      I. H. KENDALL      1,972,711
APPARATUS FOR WASHING RECEPTACLES
Filed Jan. 24, 1928      11 Sheets-Sheet 3

Sept. 4, 1934. I. H. KENDALL 1,972,711
APPARATUS FOR WASHING RECEPTACLES
Filed Jan. 24, 1928 11 Sheets-Sheet 5

INVENTOR
Ira H. Kendall
BY
ATTORNEYS

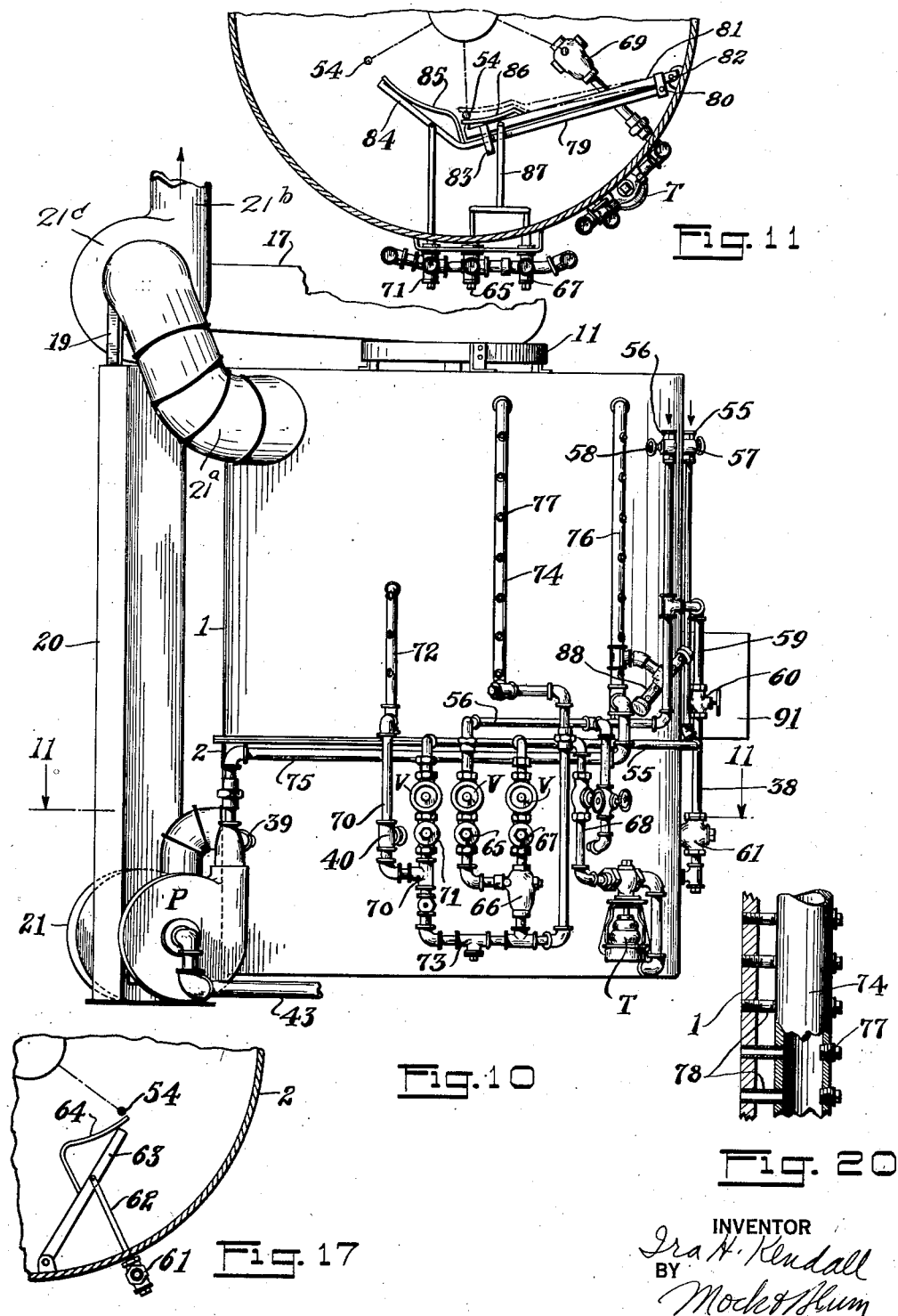

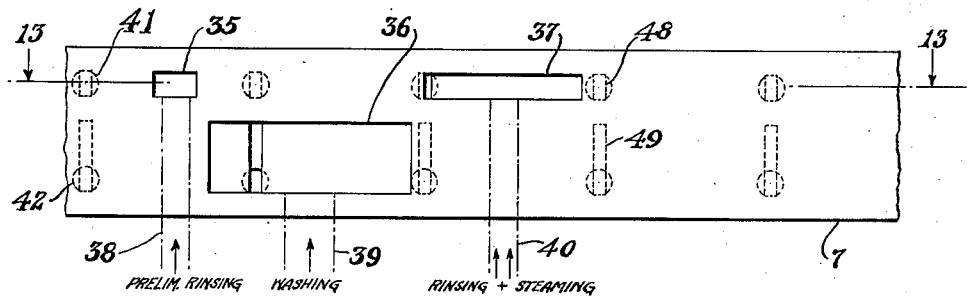
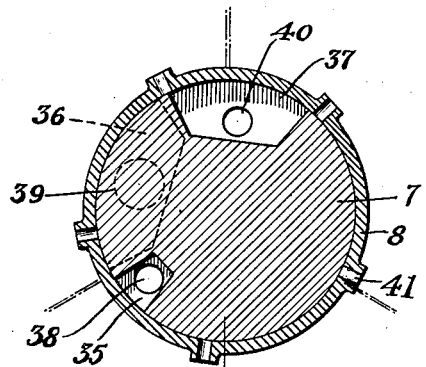
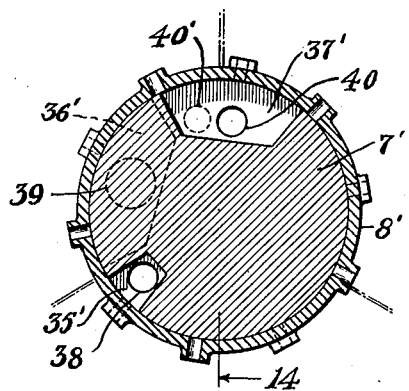
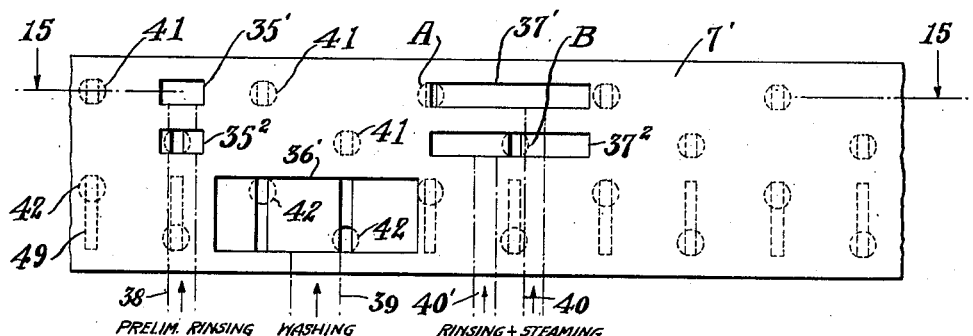

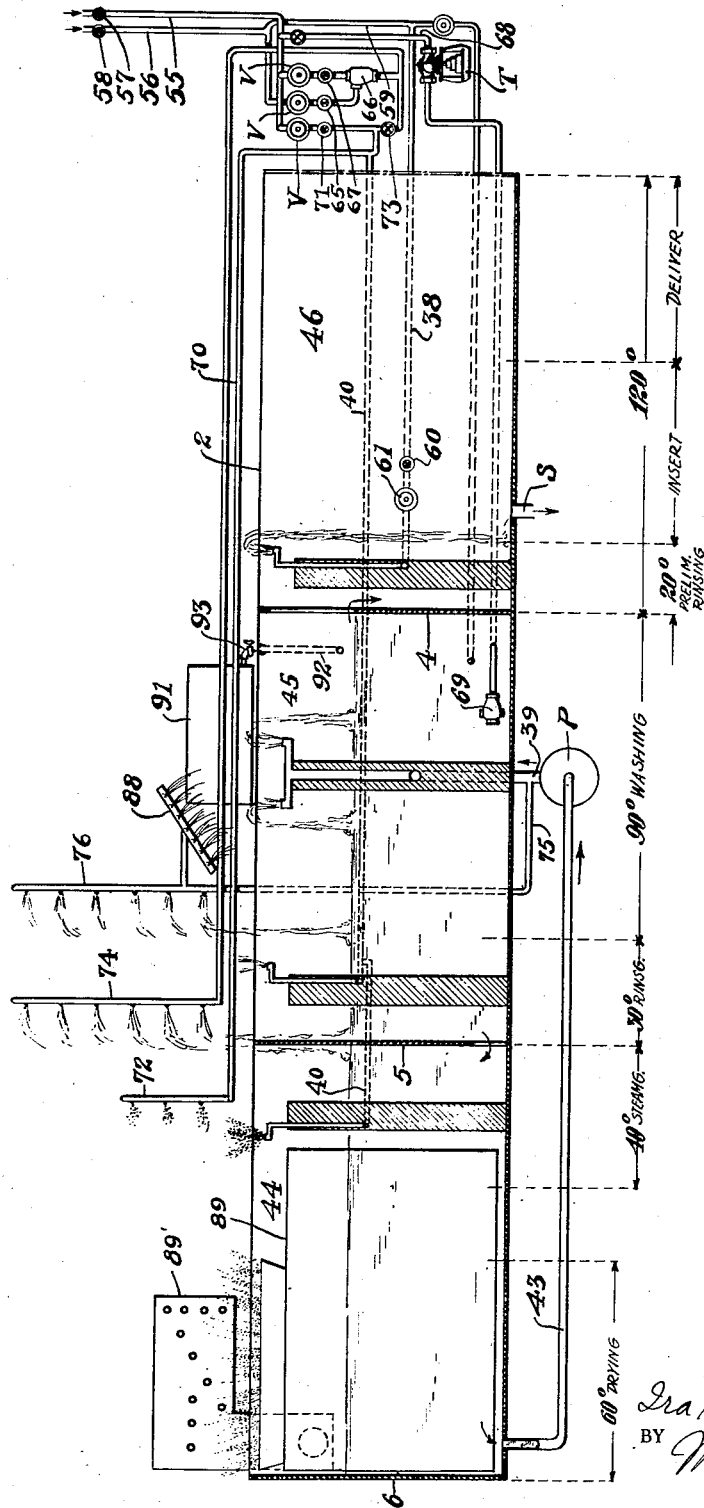

Sept. 4, 1934.   I. H. KENDALL   1,972,711
APPARATUS FOR WASHING RECEPTACLES
Filed Jan. 24, 1928    11 Sheets-Sheet 9
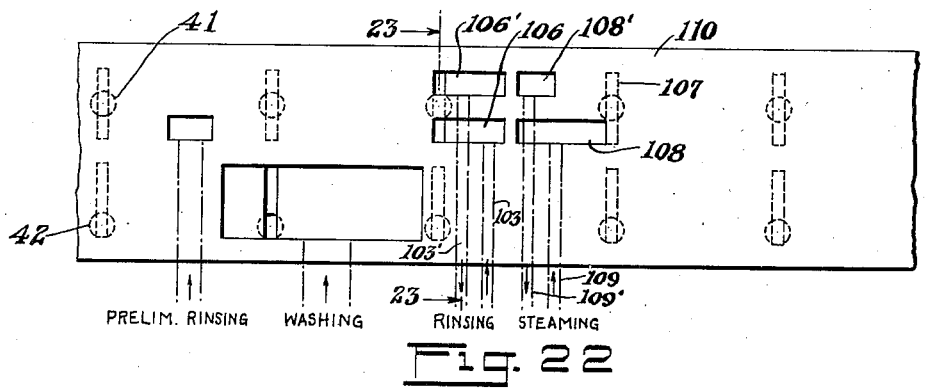
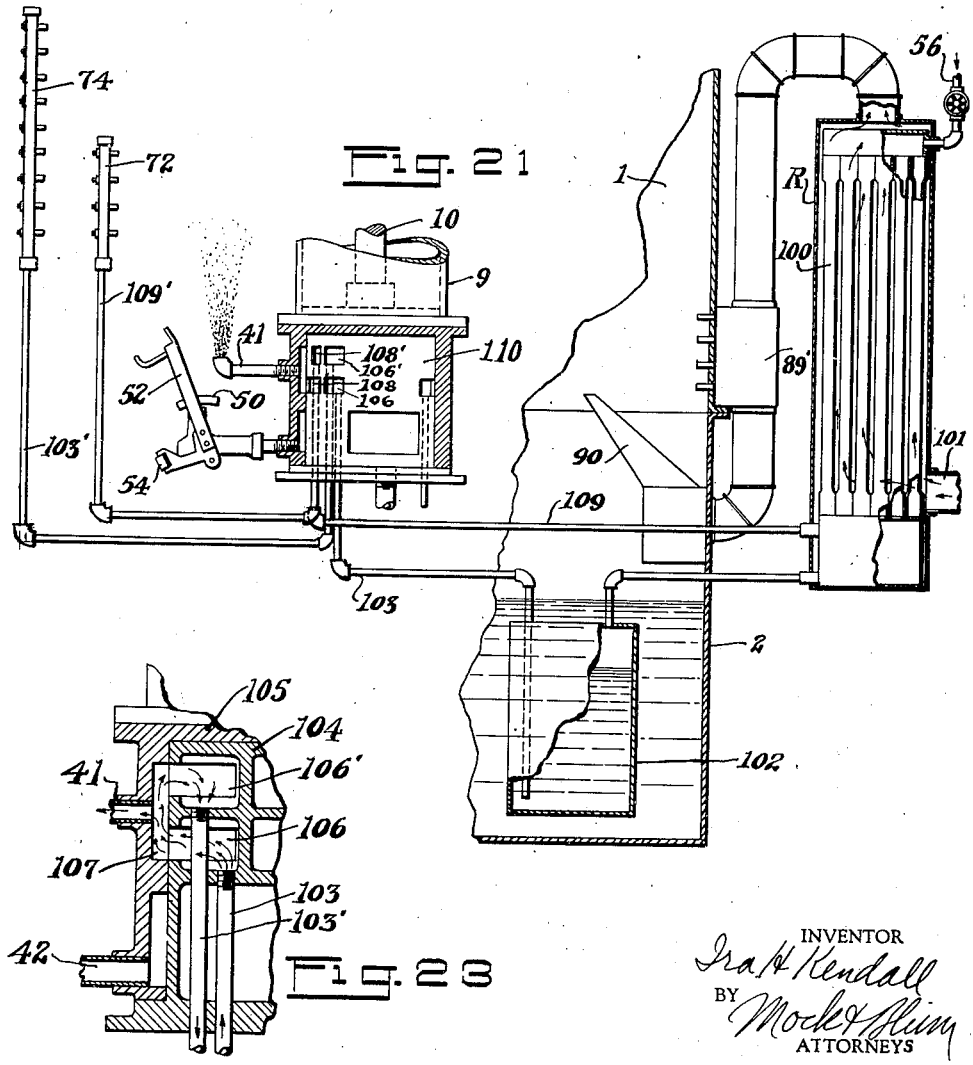

Sept. 4, 1934.   I. H. KENDALL   1,972,711
APPARATUS FOR WASHING RECEPTACLES
Filed Jan. 24, 1928    11 Sheets-Sheet 10
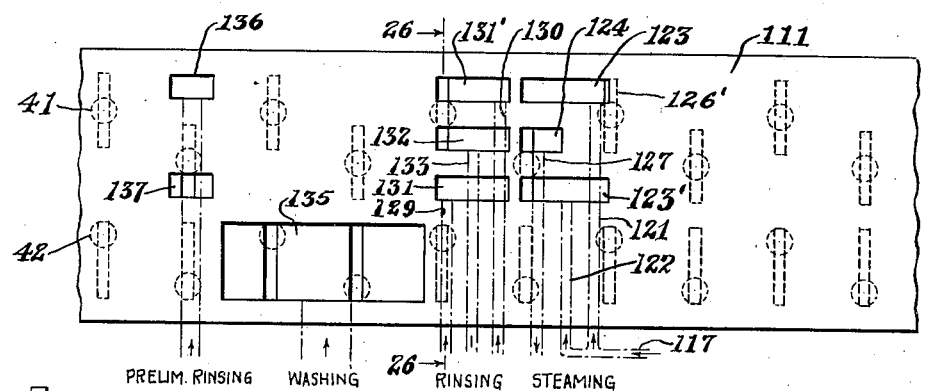
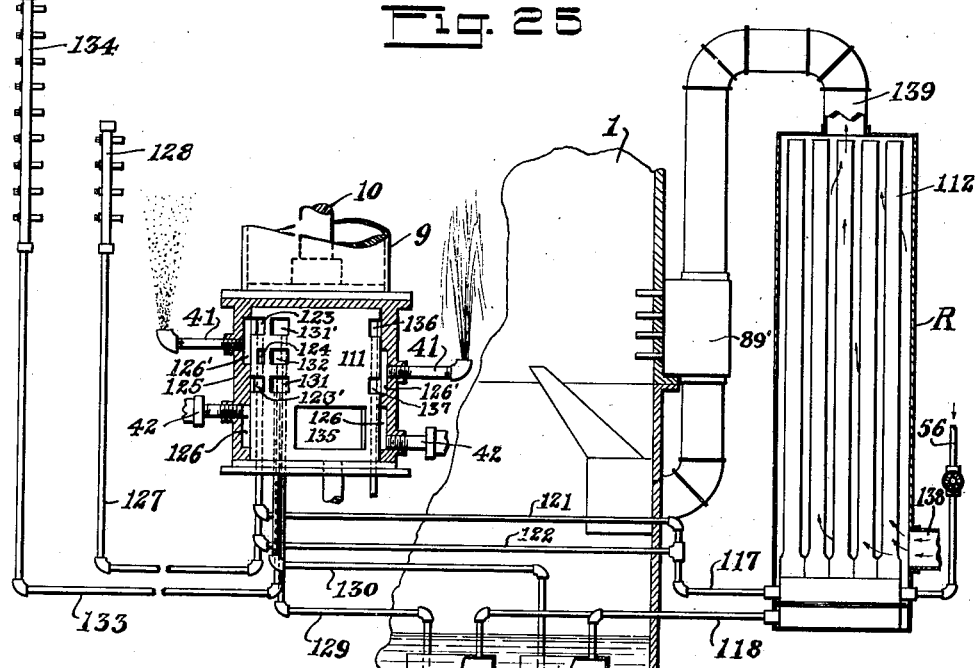

Sept. 4, 1934.  I. H. KENDALL  1,972,711
APPARATUS FOR WASHING RECEPTACLES
Filed Jan. 24, 1928  11 Sheets-Sheet 11
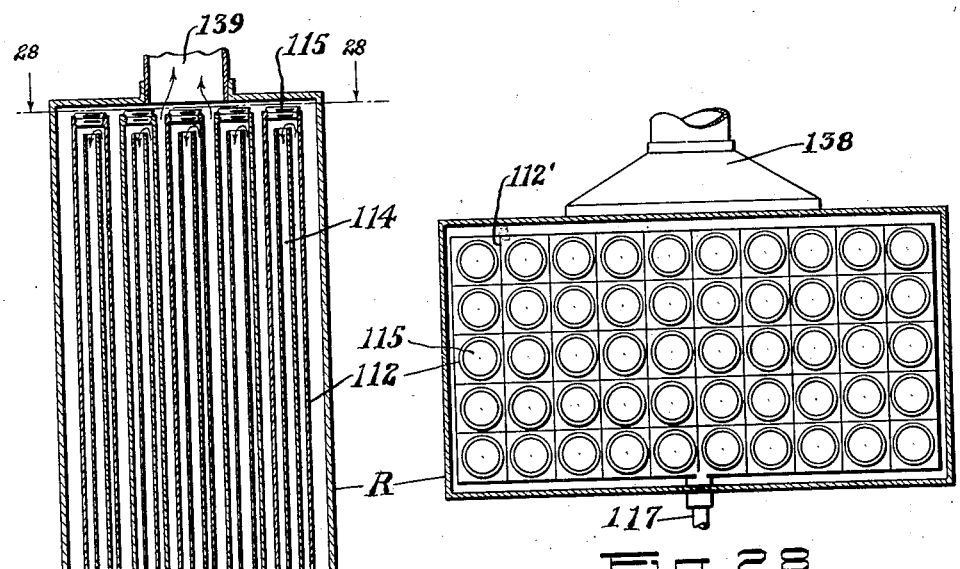
Fig. 28
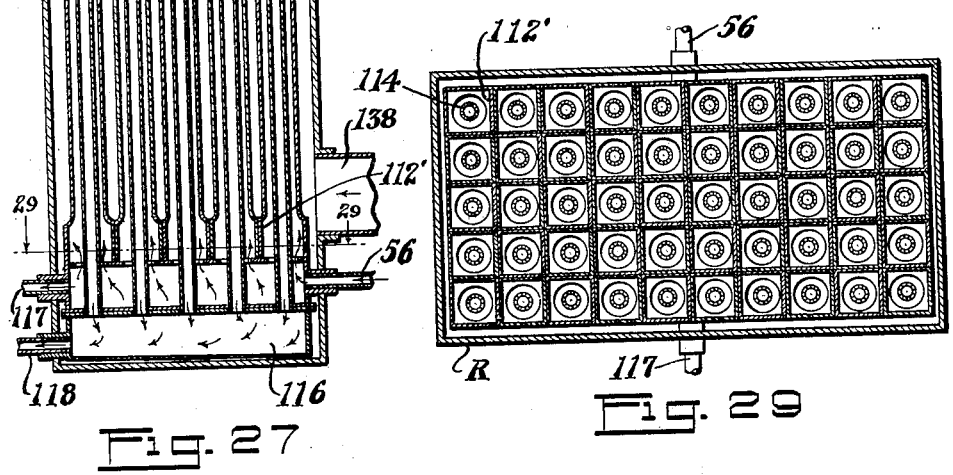
Fig. 27
Fig. 29
INVENTOR
Ira H. Kendall
BY
ATTORNEYS Patented Sept. 4, 1934

1,972,711

UNITED STATES PATENT OFFICE 1,972,711

APPARATUS FOR WASHING RECEPTACLES

Ira H. Kendall, Potsdam, N. Y., assignor to The Kendall Patents, Inc., Potsdam, N. Y., a corporation of New York Application January 24, 1928, Serial No. 249,172

20 Claims. (Cl. 141—7)

My invention relates to a new and improved mechanism for washing milk cans and other receptacles, it being understood that whenever milk cans or the covers thereof are hereinafter referred to, either in the description or the claims, these terms are to be construed as extending to all receptacles and to all covers for receptacles.

One of the objects of my invention is to provide a machine for washing milk cans and the covers thereof which shall have large capacity and which shall be very rapid and efficient in its operation.

Another object of my invention is to provide a machine for washing milk cans and the covers thereof in which the cans and their covers are caused to travel through a predetermined path in a machine, and in which a series of nozzles are caused to travel simultaneously with the cans so that large volumes of washing water, steam and the like can be caused to act upon the cans, without interrupting the continuous movement of the said cans and the covers thereof.

Another object of my invention is to provide a machine in which a nozzle is caused to move through a predetermined path together with a can or cover held in operative position with respect thereto, and in which a suitable control or controls are provided for regulating the admission of cleansing water, or steam, or both, to said nozzle at predetermined intervals.

Another object of my invention is to provide a simple and efficient control for each said nozzle, wherein the main control is provided by means of a rotary valve comprising a stationary plug or stator, and a revoluble body or rotor, the said body and plug being provided with suitable co-operating ports for regulating the admission of water or steam, or both water and steam into the said nozzle or nozzles.

Another object of my invention is to provide a machine in one form of which the regulation is solely accomplished by the proper co-operation of ports in the plug and in the body, and without the need of additional valves and control mechanisms therefor, external to the said revoluble valve.

Another object of my invention is to provide a radiator of improved and efficient design for supplying hot air for the purpose of drying the cleansed cans.

Another object of my invention is to provide air drying means whereby hot air will be delivered to the interior of a can in a series of different positions relative to the longitudinal axis of the can so that the entire interior of the can will be acted upon by a circulating current of air.

Another object of my invention is to provide improved drying mechanism for the covers of the cans whereby drops of water which cling to said covers will have a direct current of air impinged thereon so as to physically remove the said drops of water, in addition to drying the wet surface of the cover.

Another object of my invention is to provide a radiator for a machine of this type, heated by means of steam under pressure, in which the water of condensation will be collected to perform various other functions such as to heat a pool of water to be utilized for washing purposes, the said water of condensation being also directly utilized at a high temperature for directly rinsing the can.

Another object of my invention is to combine the rotary valve above mentioned with a continuously acting pump whereby a supply of wash water will be continuously delivered at predetermined intervals to a nozzle to wash the can before the final rinsing, steaming and drying thereof.

Another object of my invention is to provide a machine of this type in which the turning of the valve body will automatically and directly regulate the admission of steam into the radiator at predetermined intervals, and will also directly regulate the admission of hot water and steam to the nozzles for rinsing and steaming the can.

Other objects of my invention will be set forth in the following description and drawings which illustrate several preferred embodiments thereof, it being understood that the above general statements of the objects of my invention are intended to generally explain the same and not to limit it in any manner.

Fig. 10 is a detail elevation showing the various pipe and valve connections in one embodiment of my machine.

Fig. 11 is a detail top view of some of the connections shown in Fig. 10.

Fig. 12 is a diagrammatic view showing the development of the plug or stator, it being assumed that the plug was developed from the line indicated as "12" in Fig. 13.

Fig. 13 is a sectional view showing the plug associated with the body.

Fig. 14 is a development similar to Fig. 12 of another embodiment of my machine which may be designated as a "parallel" machine and which has greater capacity. This machine provides greater capacity with the use of a single valve of improved design.

It is assumed that the valve shown in Fig. 15 has been opened and developed from the line "14" thereof.

Fig. 15 is a detail sectional view showing the associated plug and body of the valve illustrated in Fig. 14. This corresponds to a sectional view on the line 15—15 of Fig. 14.

Fig. 16 is a diagrammatic view showing the successive operations according to the improved method.

Fig. 17 is a detail view showing the valve control for one embodiment of my invention.

Figure 18:
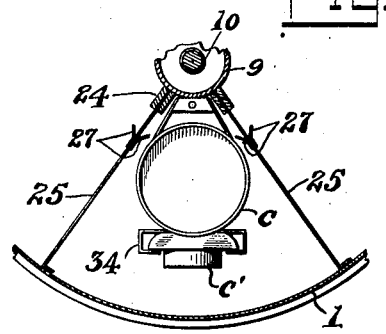

Fig. 18 is a detail top view showing a can and cover and the support therefor.

Figure 19:
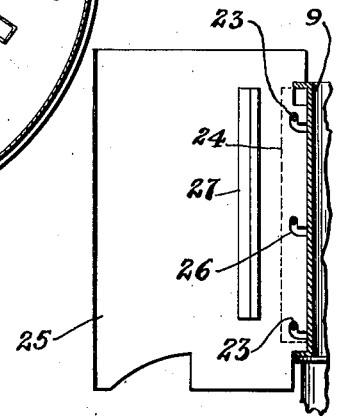

Fig. 19 is a detail view of the supporting means for one of the partitions used in one of the embodiments of my invention, showing the partition associated therewith.

Fig. 20 is a detail view showing one of the outside washing heads.

Fig. 21 shows another embodiment of the "series" type of machine having a simplified control.

Fig. 22 is a development of the plug or stator used in connection with the machine illustrated in Fig. 21.

Fig. 23 is a sectional view on the line 23—23 of Fig. 22.

Fig. 24 is a view similar to Fig. 21, but showing a "parallel" type of machine.

Fig. 25 is a development of the plug or stator used in connection with the machine shown in Fig. 24.

Fig. 26 is a sectional view on the line 26—26 of Fig. 25.

Fig. 27 is a sectional view of the radiator utilized in connection with the machine shown in Figs. 21 and 24.

Fig. 28 is a sectional view on the line 28—28 of Fig. 27.

Fig. 29 is a sectional view on the line 29—29 of Fig. 28.

Figure 1:
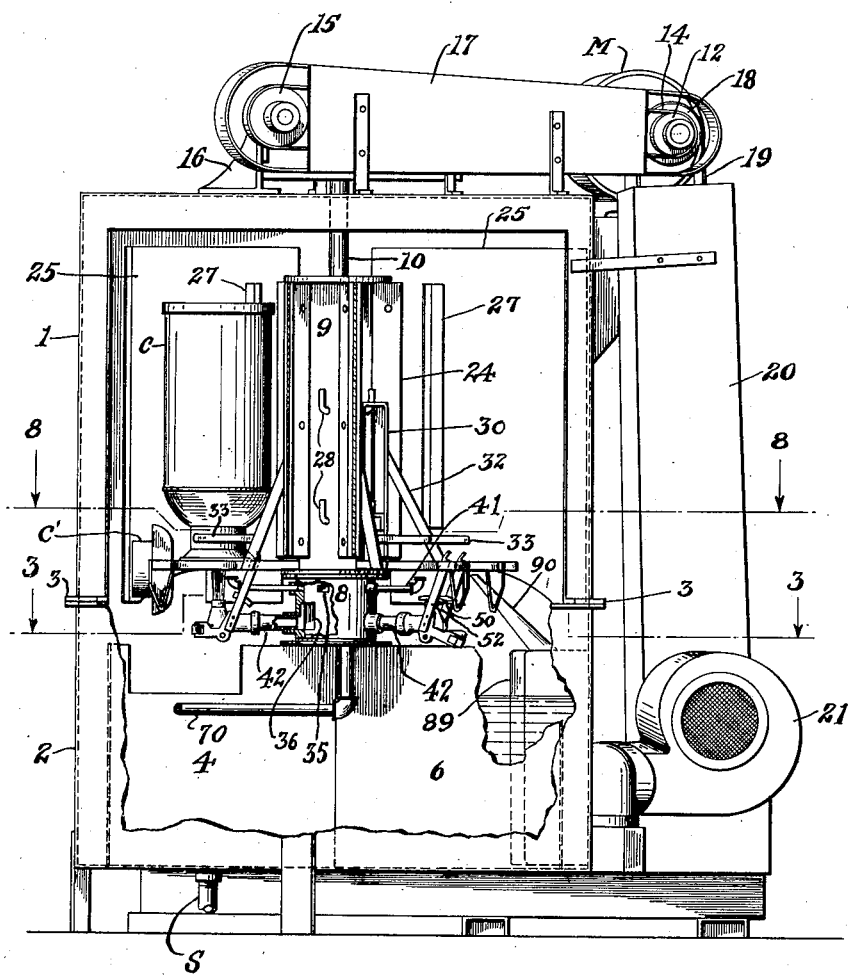
Fig. 1 is a front elevation of what may be designated as a "series" machine.
Figure 2:
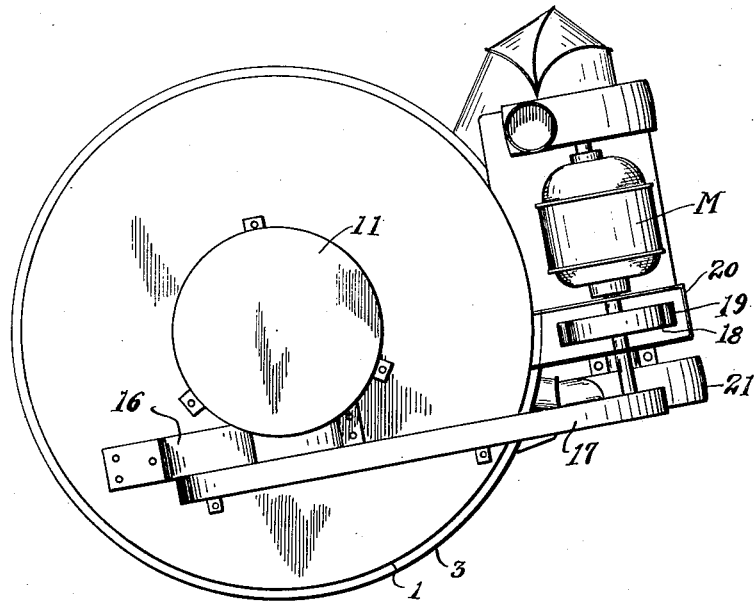
Fig. 2 is a top view thereof.
Figure 9:
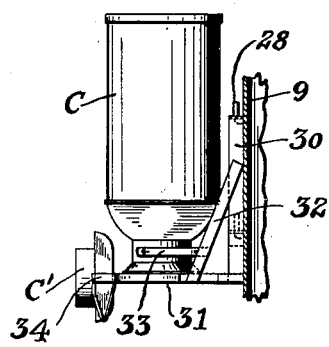
Fig. 9 is a detail side elevation partially in section showing the supports for holding a can and cover in position.

The device comprises a casing having an upper part 1 and a lower part 2 suitably joined together along their common flanges 3. In the specific embodiment shown in Fig. 1 for example, the lower part 2 of the casing constitutes a tank divided into compartments or chambers by suitable partitions 4, 5 and 6 which will be later more fully described. The device has a centrally located valve whose plug or stator part 7 is suitably connected to the tops of the partitions 4, 5 and 6. A body or rotor 8 is revolubly mounted upon the plug 7. As shown in Fig. 1 the rotor 8 is provided with a flange at the top thereof and this top flange is suitably connected to an adjacent flange to which an upstanding pipe 9 is connected. A vertical shaft 10 is connected to a flange located at the top of pipe 9 and this vertical shaft 10 also passes through the pipe 9 and it is connected to the flange located at the bottom of the pipe 9. The vertical shaft 10 is provided with any suitable anti-friction bearing so that the rotor 8 can be easily turned with respect to the stator 7. The shaft 10 is turned by means of suitable gears contained in a housing 11 and these gears are driven by means of a motor M of any suitable type whose shaft is provided with a pulley 12 which operates belt 14, which operates pulley 15, which turns the gears in housing 11 by means of suitable reduction gears contained in housing 16. The belt 14 is enclosed by a suitable protective housing 17. The shaft of the motor M has another pulley 18 upon which a belt 19 is mounted and this belt 19 passes through a second protective housing 20 to drive the air blower 21 at a relatively high speed by means of a pulley 22 mounted upon a shaft of the said air blower. The shaft of the pulley 22 is also connected to a water pump P so that the air blower and the pump are both driven at relatively high speed. As shown in detail in Fig. 19, the pipe 9 is provided with rows of pins 23. As shown in Fig. 18, the pipe 9 is provided with radial projections 24 to which the pins 23 are suitably connected so that they are located at right angles to the projections 24. The partitions 25 are provided with bayonet slots 26, as shown in Fig. 19 so that the partitions can be removably secured to the central pipe 9. These partitions 25 are provided with deflecting vanes 27 whose functions will be later more fully explained. As shown in Fig. 9, the pipe 9 has hooks 28 connected thereto intermediate the radial projections 24. The upstanding brackets 30 of the can supports are suitably mounted upon these hooks 28. These can supports comprise horizontal saddles 31 reinforced by struts 32. The struts 32 carry centering spring arms 33 so that when a can C is pushed into the position shown in Fig. 9, these spring arms bear against the neck of the can on opposite sides thereof and keep the can in its proper central position. Each horizontal can support 31 is provided with a projecting bracket 34, upon which a can cover C' can be held in radial position. As shown more particularly in Figs. 12 and 13, the stator 7 of the valve is provided with a pre-rinse recess 35, a washing recess 36 and a rinsing and steaming recess 37. Rinsing water is supplied to the rinsing recess 35 by means of a vertical pipe 38 which communicates with the bottom of said recess 35. Likewise, a water supply pipe 39 is connected to the bottom of the washing recess 36, and a pipe 40 is connected to the bottom of the rinsing and steaming recess 37 for supplying the rinsing water or steam thereto. The rotor 8 of the valve is provided with five upper nozzles 41 and with five lower nozzles 42, the said nozzles 41 and 42 being arranged in vertically superposed pairs.

As shown in Fig. 16, the pump P has an outlet connected to the water supply pipe 39 and the inlet pipe 43 of the pump is connected to the bottom of one of the compartments of the tank 2 which forms the lower part of the casing. As shown in detail in Fig. 3 and Fig. 16 this tank is divided into three compartments 44, 45 and 46 by the partitions 4, 5 and 6.

As shown in Fig. 12, the inlets of the upper pipes or nozzles 41 register successively with the preliminary rinsing port 35 and then with the rinsing and steaming port 37. The inlets of the lower pipes 42 only register with the washing port 36. Likewise, and as shown in Fig. 12, the inlets of the pipes 41 and 42 respectively register with vertical slots 48 and 49 formed in the inner wall of the rotor 8, so that there is a free delivery to said pipes 41 and 42 of either water or steam from the respective recesses of the stator 7. As shown in Fig. 1, each pair of nozzles 41 and 42 is located beneath one of the can supports, so that when the machine is operated each can is turned while it is in superposed relationship with respect to a pair of said nozzles 41 and 42. Likewise, and as shown in Fig. 1, the upturned outlet end of each nozzle 41 is laterally spaced from the corresponding upturned outlet end of the associated nozzle 42, so that each of said pipes 41 and 42 is free to send a stream of fluid into the interior of the can. Since the pump P is operated continuously, means are provided for returning the water pumped out therefrom to the tank in the bottom of the casing, if any of the can supports do not have a can mounted thereon.

Figure 4:
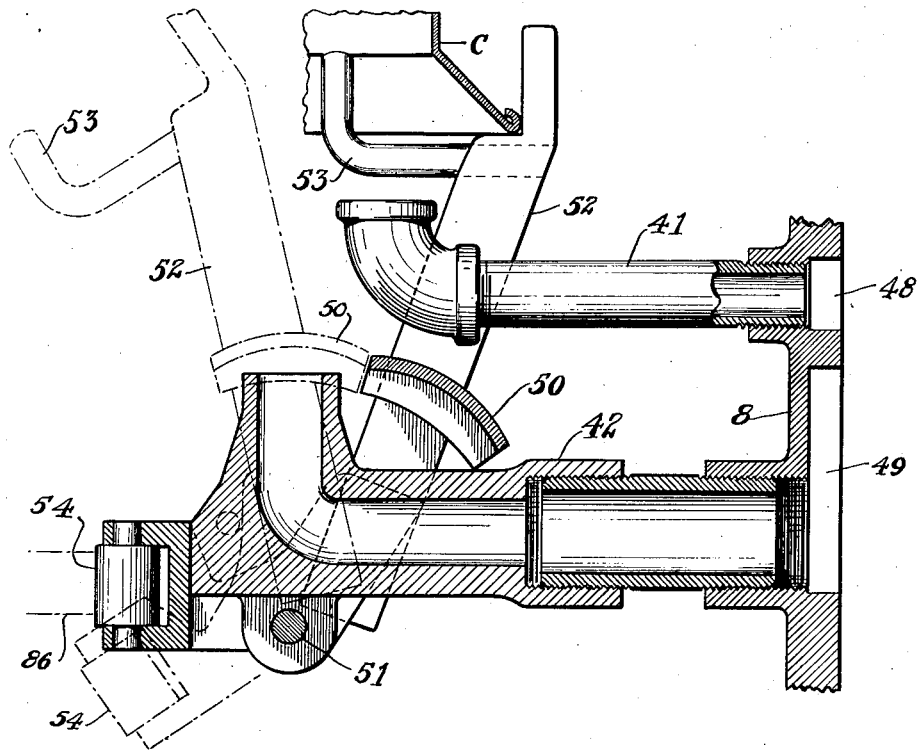
Fig. 4 is a detail sectional view showing a pair of nozzles associated with the valve body.
Figure 5:
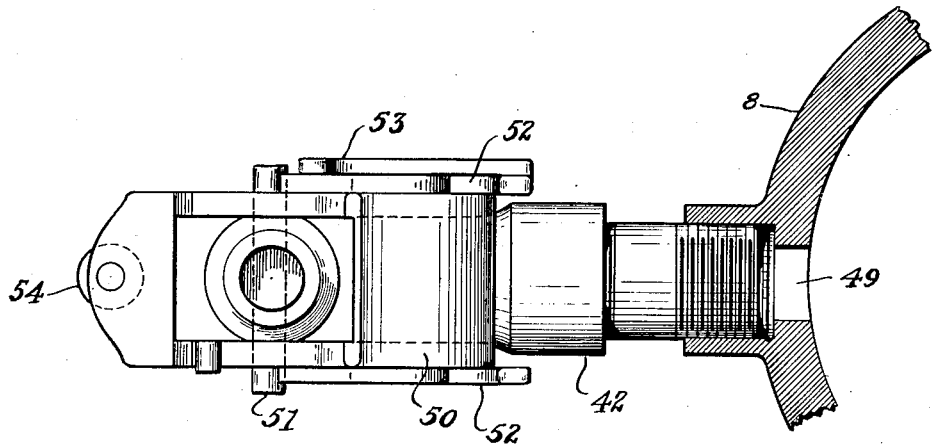
Fig. 5 is a top view of Fig. 4.

For example, and as shown in Fig. 4, a baffle 50 is mounted upon arms 52 which are pivotally mounted at 51 to the underside of the pipe 42. When the baffle 50 is in the full line position shown in Fig. 4, water can freely move upwardly from the outlet end of the nozzle 42. However, if the baffle 50 is in the dotted line position indicated in Fig. 4, this water is downwardly deflected to the bottom tank. As indicated in Fig. 4 one of the arms 52 is provided with a hook 53. When a can is pushed into proper position upon its support, the neck of the can engages the tops of the arms 52 so as to move them into the full line position shown in Fig. 4, in order to move the baffle 50 to its inoperative position. When a can C is removed from a support, the neck of the can engages the hook 53 on one of the arms 52 so as to move the arms 52 into the dotted line position indicated in Fig. 4. If desired, the arms 52 could be provided with any suitable means for normally urging them into the dotted line position.

The arms 52 have rollers 54 mounted at their outer ends, and these rollers 54 operate controls for regulating the supply of steam or hot water to the upper nozzles 41, as will be later more fully described.

Steam is admitted into the apparatus by means of a steam inlet pipe 55, and water is also admitted by means of a water inlet pipe 56. The pipe 55 is provided with a hand valve 57 and the pipe 56 is provided with a hand valve 58. The water inlet pipe 56 is connected to a branch pipe 59 having a hand valve 60 and the pre-rinse pipe 38 is suitably connected to the branch pipe 59. The supply of water to the pipe 38 and to the recess 35 is controlled by means of a poppet valve 61 of any ordinary type, such as the well known "whistle" valve which is well known in the market. As shown in Fig. 17 the whistle valve 61 is provided with a plunger 62 which is pivotally mounted to the lever 63, said lever 63 being pivotally mounted to the inside of the tank 2. The lever 63 is provided with a cam shoe 64 and this cam shoe 64 is adapted to be actuated by each roller 54 located adjacent the end of each lower nozzle 42. Hence, after a can has been placed in proper position at the open part of the machine, the roller 54 of the lower nozzle 42 located below the said can first opens the first whistle valve 61 so that cold water is forced into the interior of the can from the associated upper nozzle 41, to give the said can a preliminary rinsing. While the rinsing water may be heated if desired, it is sufficient for the purposes of an ordinary preliminary rinsing to have ordinary cold water from the available water supply used for this purpose. It will be noted that the nozzle and can move together during this preliminary rinsing and the angular opening of the preliminary rinsing recess 35 is such as to cause the continuous rinsing of the can through an angular movement of 20°, as diagrammatically indicated in Fig. 3.

The water inlet pipe 56 is connected by means of a whistle valve 65 to a branch pipe which is connected to a heating mixer or heating device 66, for mixing the cold water supplied from the pipe 56 with steam supplied from the steam pipe 55 to a branch pipe controlled by another whistle valve 67. Each of these branch lines is provided with a hand control valve V. The steam pipe 55 is connected to another branch pipe 68 and this is connected to a heater 69 located in the tank 2, a thermostat control T being provided for regulating the admission of steam to the heater 69 in accordance with the temperature desired for the contents of the tank 2.

The steam pipe 55 is also connected to a branch pipe 70 controlled by a whistle valve 71 and this branch pipe 70 is connected to the outside washing and steaming head 72, which is used for washing and steaming the cover of the can. This head 72 operates to first deliver hot water to wash the cover, and to then cause steam to impinge upon the cover. A check valve 73 is provided for preventing the steam which is admitted into the pipe 70, from passing to the outside rinsing head 74, so that the outside rinsing head 74 is supplied only with hot water from the heating mixer 66. The pump P is provided with a second outlet 75 which is connected to an outside washing head 76. This outside washing head functions to wash the outside of the can, and it is connected to a cover washing head 88, which is inclined to the direction of movement of the cover. These outside washing heads are located at the upper part of the casing so that they enable the outside of the can to be treated either by hot water or by steam, it being understood that all of the water or steam moves towards the center of the casing and that none of it is allowed to escape from the outside of the casing. As shown in Fig. 20, these outside washing heads comprise vertical pipes which have holes drilled through them, the holes spaced from the inner wall of the casing being closed by plugs 77, and the holes located upon the inner surface of the said vertical pipes being provided with nipples 78, which pass through holes in the casing.

The pipe 70 is connected to the branch pipe 40 which supplies the hot rinsing water or the steam to the plug, this connection being shown in Fig. 10.

The control for the whistle valves 65, 67, and 71 is shown in detail in Fig. 11. An outer control lever 79 is pivotally mounted at 80 to an arm carried by an inner control lever 81 pivotally connected to the casing at 82. The outer lever 79 passes through a supporting collar 83, in which said outer lever 79 can move back and forth for a limited distance. Likewise, the outer lever 79 is provided with an inturned end 84 having a cam shoe 85 connected thereto. The inner lever 81 is also provided with a cam shoe 86. A suitable spring may be connected to the inner lever 81, so as to normally hold it in the dotted line position indicated in Fig. 1. When a roller 54 presses upon the cam shoe 86, it outwardly forces the plunger 87 which is connected to the whistle valves 65 and 67 so as to simultaneously open the said whistle valves 65 and 67. This is accomplished without actuating the outer lever 79 as there is enough space provided between the levers 81 and 79. For example, it will be noted that the lever 81 does not abut the lever 79, in the full line or operative position of said lever 81 which is shown in Fig. 11. When the member 87 is actuated, so as to simultaneously open the whistle valves 65 and 67, cold water and steam simultaneously enter the mixing device 66 and since the hot water thus produced can pass through the check valve 73, the hot water is forced by the steam pressure to the pipe 40 to recess 37, and also to the cover head 72 and to the outside rinsing head 74. The actuating roller 54 then clears the cam shoe 86 thus permitting the whistle valves 65 and 67 to close. The operating roller 54 then presses upon the cam shoe 85 to actuate the outer lever 79 alone, so as to open the whistle valve 71. This causes steam alone to pass to the pipe 40 and recess 37, and to the short outside steaming head 72, which steams the cover of the can. The passage of the steam to the outside rinsing head 74 is prevented by the check valve 73. The outside rinsing head 74 may be provided with nipples to force hot rinsing water upon the cover.

Figure 3:
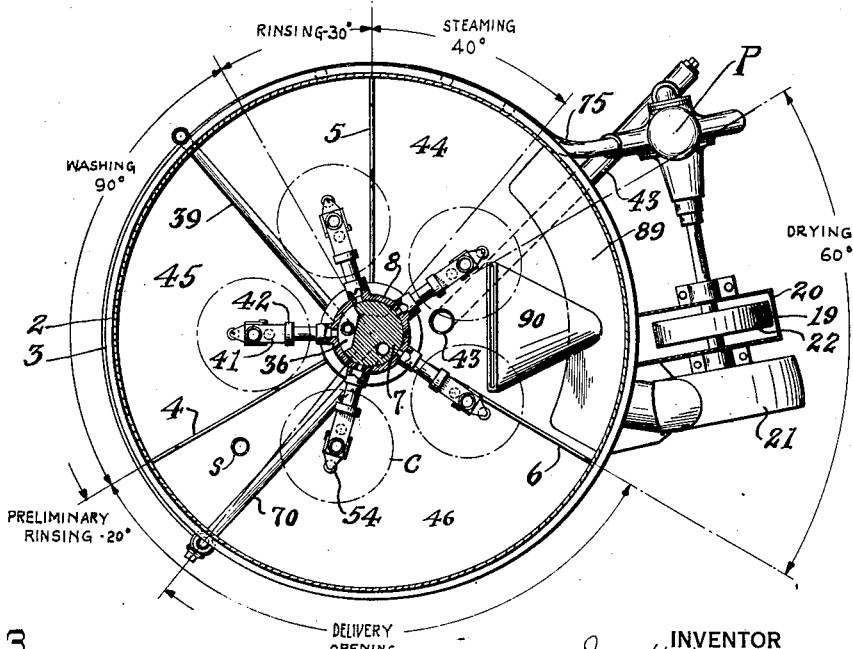
Fig. 3 is a sectional view on the line 3—3 of Fig. 1.

As indicated in Fig. 3, and in Fig. 16, the angular opening of the washing recess 36 is 90° so that the interior of each can is continuously washed by means of water supplied by the pump P, for an interval corresponding to one-fourth of its movement through the machine. Likewise, it will be noted in Fig. 3 that since this "series" machine has five equally spaced pairs of nozzles, that the angular distance between each pair of nozzles is 72° so that two cans will be simultaneously washed in the operation of the machine.

Likewise, and as diagrammatically illustrated in Fig. 3 and in Fig. 16, the rinsing and steaming recess 37 has an angular opening of 70°. During 30° of the movement of the can through the machine, the corresponding upper nozzle 41 and the outer heads 72 and 74 will be supplied with hot water because of the simultaneous opening of the whistle valves 65 and 67, and said corresponding nozzle 41 and the outer head 72 will be supplied with steam only for the remaining 40° of the said movement, because during this period only the whistle valve 71 is open.

After the interior of each can has been thus pre-rinsed, washed with water supplied by the pump, rinsed with clean hot water, and then treated with steam, and after the outside of each can has been washed with water supplied from the pump, and has then been rinsed with clean hot water, and after each cover has been also washed, rinsed with hot water and steamed, the can and cover are now moved to the drying part of the apparatus. It may be noted at this point that the cover washing head 88 is connected to the outside washing head 76 (connected to the pump) so that each cover is thoroughly washed by a series of radial streams of water as it passes in front of the cover washing head 88.

Figure 6:
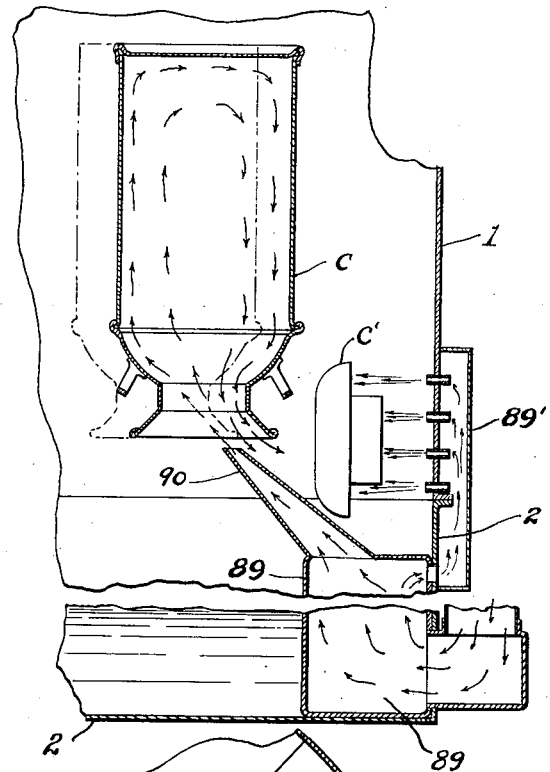
Fig. 6 is a diagrammatic view showing the drying mechanism.
Figure 7:
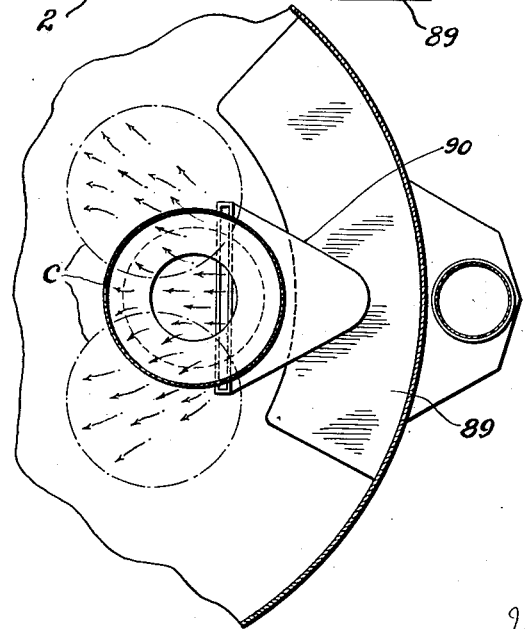
Fig. 7 is a top view of Fig. 6.
Figure 8:
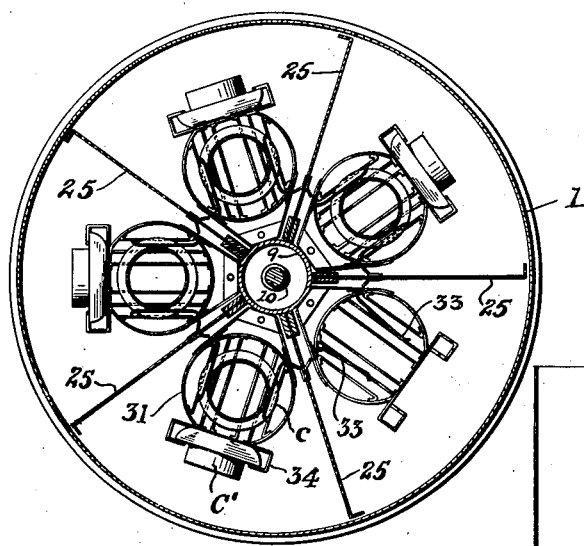
Fig. 8 is a sectional view on the line 8—8 of Fig. 1.

As shown in detail in Figs. 6 and 7, the air which passes out of the blower 21 passes into the air tank 89 which is immersed in the hot water contained in the tank 2 so that the air issuing from said tank 89 is heated. The air nozzle 90 has a substantially rectangular opening which is spaced from the longitudinal axis of the can and said outlet opening is also substantially perpendicular to the corresponding lateral radial line of the can, when said can is centrally over the said outlet opening. As a result of this construction, the current of hot air is caused to successively pass over and out of different zones of the interior of the can so as to thoroughly dry said interior. Likewise, and as shown in Fig. 7, the hot air passes over the entire outside of the can so as to dry the same. As shown in Fig. 6, part of the air enters a drying head 89', which dries the underside of the cover of the can. The can and can cover are thoroughly heated by the steam before being dried by the air, so that they can be quickly dried. However, the narrow, powerful jets of air delivered from 89' are useful because they dislodge and carry away drops of water which might not be dried by ordinary methods. In order to cause the washing and rinsing water delivered by the outside heads to thoroughly act upon all parts of the outside of the can, the vanes 27 are provided upon the partitions 25. The outside heads are so arranged that part of the water issuing therefrom impinges upon the adjacent vane 27 so as to cause this water to be deflected and to pass completely around the rear portion of the can and subject this to a thorough washing and rinsing operation.

As shown in Fig. 10, at or near the top of the enclosed casing which surrounds the working parts of the machine, is mounted a suction blower 21—c. The suction side of this blower is connected by means of flue 21—a to said casing, which when in operation will draw the air and waste steam from this casing and discharge same through flue 21—b, which may be piped out-of-doors, thus preventing the escape of this waste steam into the room through the opening at the front of this casing.

This is a decided advantage, as it prevents the waste steam from condensing on the walls of the room and makes the room free from fog, thus greatly increasing the visibility of the operator.

As before stated, the "series" type of machine has five nozzles so that five cans can be carried through the machine. By utilizing the form of valve shown in Figs. 14 and 15, the capacity of the device can be doubled with the use of a single valve of improved design, the arrangement of nozzles and control parts being generally the same as before.

As shown in Fig. 15 the pre-rinse ports or recesses 35' and 35$^2$, the washing recess 36' and rinsing and steaming recesses 37' and 37$^2$ are constructed as previously mentioned. However the rotor 8' is now provided with ten pairs of the nozzle outlets 41 and 42. As shown in Fig. 14, the ten nozzle outlets 41 are arranged in two rows, the successive nozzle outlets 41 being arranged in staggered relationship. The ten lower nozzle outlets 42 are also arranged in staggered relationship. The stator 7' shown in Fig. 14 is provided with two pre-rinse recesses 35' and 35$^2$, and two rinsing and steaming recesses 37' and 37$^2$, having separate supply pipes 40 and 40'. The stator 7' is provided with a single washing recess 36'. As diagrammatically shown in Fig. 14, the successive upper outlet nozzles 41 are alternately aligned with the pre-rinse recesses 35' and 35$^2$, and they are also alternately aligned with the rinsing and steaming recesses 37' and 37$^2$. Two of the lower outlet nozzles 42 can be simultaneously aligned with the washing recess 36'. Hence, as the ten pairs of nozzles turn with their rotor, the upper nozzles 41 alternately receive pre-rinsing water and then after the supply of rinsing water has been discontinued, adjacent washing nozzles 42 receive a supply of washing water. The supply of pre-rinse water is discontinued before washing water is supplied by the pump. Then one of the upper nozzles 41 receives hot rinsing water after the supply of washing water has been discontinued to its corresponding lower nozzle 42, and then one of the upper nozzles 41 receives rinsing water while the next upper nozzle 41 receives a supply of steam. Thus the nozzle 41 shown in the position designated by "B" in Fig. 14 is about to receive steam alone, while the preceding nozzle 41 shown in the position "A" receives hot water.

As diagrammatically shown in Fig. 16, the compartment 46 is provided with a sewer outlet S. Hence, water which has been used for pre-rinsing passes directly to the sewer so that the compartment 46 does not contain a permanent pool of water. The partition 4 is provided with a recess in the top thereof so that a constant level of water is maintained in the compartment 45, so that any excess of water in said compartment 45 flows into the compartment 46 and out to the sewer. The floating greasy and milky substances which are washed out of the cans and fall into the compartment 45 thus tend to pass into the outlet compartment 46, while the cleaner portion of said wash water remains in the compartment 45. The partition 5 is provided with a notch or recess at the bottom thereof so that a constant level is maintained in the compartments 44 and 45. The location of the notch in the partition 5 at the bottom thereof prevents the substances floating upon the top of the water in the compartment 45 from entering the inlet compartment 44, from which water is drawn to the pump.

The water in the compartments 44 and 45 may contain any suitable dissolved cleansing substances such as caustic soda or the like. In order to keep this wash water charged with the caustic soda, a tank 91 is provided which contains a strong solution of the caustic soda. This tank 91 is provided with an outlet pipe 92 which enters the compartment 45, the said pipe 92 being provided with a valve 93. The valve 93 is set so that the strong alkaline solution in the tank 91 drips steadily into the compartment 45 so as to keep the wash water sufficiently alkaline at all times.

The operation of these embodiments of my device is as follows:—The operator places a can and can cover upon one of the supports provided therefor, thus moving the corresponding baffle 50 into the inoperative position. The shaft 10 is turned so slowly that an operator has ample time to remove a washed can and replace it with a dirty can at the open delivery part of the machine. As the can turns with the rotor part of the valve, the whistle valve 61 is first opened when the inlet of the corresponding upper nozzle 41 is in registration with the preliminary rinsing port. As shown in Fig. 4, if a can is not mounted upon its support, the roller 54 moves from the operative position shown in full lines in Fig. 4 to the dotted line position shown in said Fig. 4 because the arm of the roller is also mounted upon the pivot 51. Hence, the whistle valve 61 is not operated unless a can is in position to be rinsed. The upper nozzle 41 is now supplied with rinsing water during an angular movement of 20°. The supply of rinsing water is now shut off and the corresponding lower nozzle 42 is now moved into registration with the washing recess 36. The pump P now operates continuously to supply wash water from the pool in the tank to the corresponding lower nozzle 42 and also to the outside washing head 76. If a can is in proper position upon a support the wash water supplied to the lower nozzle 42 is free to enter the interior of the can. If the can support does not have a can thereon, the baffle 50 operates to deflect the water back into the pool in the tank 2. The water supplied to the outer washing head 76 falls downwardly into the compartment 45. The pump simultaneously operates to supply wash water to the cover washing head 88 from which a number of streams of water issue at different levels towards the central axis of the device. Hence, the cover is thoroughly washed from top to bottom and for a longer period of time than if the water were concentrated in a single jet, and it is also washed for a longer period of time than if the head 88 were in a vertical position. If there is no cover in position on its support, the streams of water issuing from the cover washing head 88 fall back into the pool maintained in the compartment 45. Each lower nozzle 42 is thus supplied with wash water for an angular distance of 90° and two of these wash heads simultaneously operate for a short interval so that the pump P is always effective for supplying wash water to one of the lower nozzles and there is no time in which wash water is not free to issue therefrom.

The inlet end of a lower nozzle 42 now moves out of alignment with the washing recess 36 and the corresponding upper nozzle 41 now moves into alignment with the rinsing and steaming inlet 37. If the support does not have a can thereon so that the roller 54 remains inoperative, the remaining whistle valves are not operated. However, if a can is in proper position, the whistle valves 65 and 67 are then opened to supply clean hot water to the corresponding upper nozzle 41, to the outside head 72, and to the outside rinsing head 74. This causes the inside and outside of the can to be thoroughly rinsed with clean hot water, and also causes the cover to be thoroughly rinsed. The outer rinse water passes around and rinses the rear of the can due to the action of the vanes 27 which are located on the partitions 25.

After the rinsing has continued for an angular distance corresponding to 30°, the whistle valves 65 and 67 are then closed and the whistle valve 71 is then opened to supply steam to one of the upper nozzles 41 and the outside head 72 for thoroughly steaming the interior of the can and the cover. The outside of the can is not steamed as this is not absolutely necessary and this would require a large amount of steam. The clean hot cans and covers are now subjected to the action of the hot air forced against them by the blower, this supply of hot air being continuously maintained. The hot air passes into and around all parts of the can both inside and outside so as to thoroughly dry the same. Even if the drying air is not maintained at a high temperature it can efficiently dry the can because this has been heated by the hot steam which has been forced into the interior of the can.

The operation of the "parallel" type of machine is the same as that previously described, it being understood that each of the pre-rinse ports or recesses 35' and $35^2$ is provided with a separate supply pipe each having a separate whistle valve, and that each of the rinsing and steaming ports 37' and $37^2$ is also provided with a separate supply pipe system each having its own whistle valve system. The control means for the whistle valves are as before described. Likewise, two sets of outer rinsing heads 74, and of outer rinsing and steaming heads 72 are provided.

In the embodiment shown in Fig. 21, steam is admitted through pipe 56 into the top chamber of radiator R. The steam then passes downwardly through pipes 100, whose upper ends are preferably square in shape, said upper ends being welded together. The air for drying the cans and covers is forced in through inlet 101 and passes up between the spaced central parts of pipes 101 to the nozzle 90 and the cover dryer 89'. The air is thus directly heated by steam.

The condensed steam passes out of the radiator to the hot water tank 102, which performs the same function as heater 69 previously described, namely, to heat the wash water. The hot water in tank 102 can be forced out therefrom with considerable pressure by the steam admitted into the radiator.

The supply pipe 103 for the hot rinse water is connected to port 106 in the plug 104. The turnable valve body 105 is provided with a series of valve body recesses 107, each of which communicates with an upper nozzle 41. Likewise, each valve body recess 107 can connect the port 106 to the corresponding outlet port 106', which is connected to outlet pipe 103', which is connected to outside washing head 74. Hence, when a valve body recess 107 communicates with and connects the ports 106 and 106', hot water is forced out of tank 102 to thoroughly rinse the inside and outside of the can, and to rinse the can cover, in the manner previously described.

The steam compartment at the bottom of radiator R is connected by a pipe 109 to the steam recess 108 in the plug 110. The valve body recess 107 connects recess 108 to an outlet recess 108', connected by outlet pipe 109' to outside steaming head 72, provided for steaming the can cover. Hence, the movement of the valve body alone controls the supply of rinsing water and steam. The pre-rinse port is the same as before, save that the whistle valve and its control are omitted. Of course, the turning movement of the valve body first operates to connect the hot water recesses 106 and 106' to each other and to an upper nozzle 41. Then after the inside and outside of the can has been thoroughly rinsed, and the can cover has also been thoroughly rinsed with clean hot water, the turning movement of the valve body causes its recess 107 to then connect the steam ports 108 and 108' to each other and to a nozzle 41.

The embodiment shown in Figs. 24–26 represents a machine of the type shown in Figs. 21–23, save that the embodiment shown in Figs. 24–26 is of the "parallel" type. As shown in Figs. 25 and 27, the steam inlet pipe 56 is connected to a compartment in the bottom of the radiator casing R. This compartment communicates with the open bottoms of the tubes 112. Each tube 112 has an inner concentric tube 114 mounted therein and these outlet tubes 114 pass through the steam compartment in the bottom of the radiator casing. Hence, the steam which enters the bottoms of the tubes 112 passes to the tops of the said tubes which are closed by the plugs 115, and the steam then passes through the pipes 114, to the bottom compartment 116, also located in the bottom of the radiator casing. The steam can also pass directly out of the steam compartment through the pipe 117. The bottom compartment 116 is connected by the pipe 118 to two water tanks 119 and 120, in which the water formed by the condensation of the steam can accumulate, so as to heat the wash water, and to be also used for directly rinsing the inside and outside of each can, and for rinsing the can cover. The outlet steam pipe 117 is connected to two pipes 121 and 122 and these pipes 121 and 122 are respectively connected to the steam inlet recesses or ports 123 and 123'. A steam outlet recess or port 124 is formed in the plug 111. The rotor 125 of the valve is provided with ten upper nozzles 41 and ten lower nozzles 42, these being arranged in staggered relationship as previously explained in connection with Fig. 14. Each upper nozzle 41 is associated with a valve body recess 126'. An upper recess 126' associated with an upper pipe 41 is adapted to connect the top recess or port 123 to the outlet port or recess 124. A recess 126' of a pipe 41 located on the lower line is adapted to connect the bottom recess 123' to the intermediate outlet recess 124. The intermediate outlet recess 124 is connected by means of a pipe 127 to the outside steaming head 128 which is adapted to operate upon the cover of the can. Hence, if an upper recess 126' associated with an upper nozzle 41 located on the upper line is in a position corresponding to that shown in Fig. 26 (which shows the operative position of the ports for delivering the wash water) then steam passes directly through the radiator casing to the pipe 117 to the pipe 121, to the upper steam recess 123, out of an upper nozzle 41, and also out through the pipe 127 to the outside steaming head 128. If a lower recess 126' associated with a pipe 41 located on the lower line is in operative position, then steam passing through the pipe 117 is free to enter the pipe 122, to then enter a recess 123', and to pass out of a lower nozzle 41 and to also enter an intermediate recess 124, to then pass to the outside steaming head 128. The bottoms of the tanks 119 and 120 are connected by means of pipes 129 and 130 to the hot water recesses or ports 131 and 131'. An intermediate hot water port 132 is provided and this is connected by means of an outlet pipe 133 to an outside washing head 134. The action of the respective upper and lower recesses 126' is the same as that previously mentioned in that hot water is free to enter the plug of the valve through one of the pipes 129 and 130, to then pass out through the nozzle 41 and through the pipe 133 to the outside washing head 134. Of course, the rinsing action with the hot water precedes the steaming action.

Each lower nozzle 42 is associated with a valve body recess 126 which communicates with the wash water recess 135 in the plug 111. Pre-rinse ports 136 and 137 are provided in the manner previously mentioned. It will be noted that the port 132 has the same dimensions as the ports 131 and 131'. However, the port 124 is smaller than the ports 123 and 123' so as to properly distribute the steam between the operating nozzle 41 and the outer steaming head 128. The air to be heated enters the radiator casing through the pipe 138 and the heated air passes out to the air nozzle through the pipe 139. As shown in Fig. 29, the bottom portions 112' of the pipes 112 are squared and these squared ends are welded together so as to form a tight closure. The same result is produced at the tops of the pipes 112 as clearly illustrated in Fig. 28.

It is obvious that the outside washing heads such as 74 for example could be arranged within the casing 1 so that whenever I refer to an "outside" washing head I generally intend to refer to a head adapted to wash the exterior of the can.

I have shown a preferred embodiment of my invention, but it is clear that numerous changes and omissions could be made without departing from its spirit.

I claim:—

1. In a washing machine for washing receptacles and the covers thereof, a turnable support having radially-projecting brackets adapted to support said receptacles, while said receptacles are in inverted position, the outer lower portions of said brackets having means adapted to hold the covers in substantially vertical position with the inner portions of said covers outwardly directed, and means adapted to direct into said receptacles and upon said covers jets of fluid which are caused to move in different directions.

2. In a machine for washing objects, the combination of a tank having a compartment adapted to contain a pool of wash water, a pump having an inlet opening connected to the said compartment, said pump having an outlet connected to a washing nozzle, a movable baffle mounted adjacent the mouth of said nozzle and adapted to deflect the wash water issuing from said nozzle back into said pool and means connected to the said baffle and adapted to be operated by the movement of an object to be washed into operative position with respect to the outlet of the said nozzle, so that when said object is moved to said operative position the said means is operated thereby to move the baffle to inoperative position to permit the wash water to impinge upon the said object.

3. In a machine for washing a receptacle, the sub-combination of a movable support adapted to carry the receptacle in vertical position, a nozzle adapted to direct a substantially horizontal jet of fluid towards the receptacle, and a deflecting vane mounted on said support adjacent the point where the said receptacle is mounted, said deflecting vane being adapted to receive a portion of the fluid delivered from the said nozzle, to deflect the said fluid along a substantially horizontal line towards the rear portion of the receptacle so that the fluid passes around the vertical outer wall of the receptacle.

4. In a machine for washing receptacles, the sub-combination of a support adapted to carry a plurality of receptacles to be washed, partitions connected to the said support to separate adjacent receptacles, deflecting vanes connected to the said partitions and nozzles adapted to cause streams of fluid to impinge upon the said receptacles and upon the said vanes, so that portions of said streams of fluid are deflected by said vanes towards the rear portions of the said receptacles.

5. In a machine for washing receptacles, the combination of a central revoluble shaft, supports for carrying the said receptacles connected to the said shaft and movable therewith, partitions intermediate the said supports, said partitions being connected to the said central shaft, oppositely inclined deflecting vanes connected to the said partitions, and a head adapted to deliver fluid which impinges upon the receptacles and upon said deflecting vanes.

6. In a machine for washing receptacles, the combination of a central revoluble shaft, supports for carrying the said receptacles connected to the said shaft and movable therewith, partitions intermediate the said supports, said partitions being connected to the said central shaft, oppositely inclined deflecting vanes connected to the said partitions, and a head adapted to deliver fluid which impinges upon the receptacles and upon said deflecting vanes, said revoluble shaft being provided with pins and said partitions being provided with bayonet slots whereby said partitions can be removably connected to the said shaft.

7. In a machine for washing receptacles, the combination of a valve plug having a peripheral port therein, a supply pipe connected to the said peripheral port, a revoluble valve body mounted upon the said plug, said valve body having a nozzle projecting therefrom and having an inlet opening adapted to be aligned with the said peripheral port, a support adapted to carry the receptacle to be washed, said support being movable in unison with said valve body, said supply pipe having a control valve, and control means carried by and radially projecting from the said revoluble valve body and adapted to operate the said control valve.

8. In a machine for washing receptacles, the combination of a valve plug having a peripheral port therein, a supply pipe connected to the said peripheral port, a revoluble valve body mounted upon the said plug, said valve body having a nozzle projecting therefrom and having an inlet opening adapted to be aligned with the said peripheral port, a support adapted to carry the receptacle to be washed, said support being movable in unison with said valve body, said supply pipe having a control valve, and control means carried by the said revoluble valve body and adapted to operate the said control valve and supplemental means for setting said control means in operative position, said supplemental means being adapted to be operated by the insertion of a receptacle upon the support therefor.

9. In a machine for washing receptacles, the combination of valve plug having a first peripheral port through which wash water is adapted to be forced, said plug having a second peripheral port through which either hot rinse water or steam is adapted to be forced, said first port and said second port being arranged at different heights in the said plug, a revoluble valve body mounted upon the said plug, said revoluble valve body having a pair of nozzles provided with separate inlet openings, one of said inlet openings being adapted to be aligned with the first port and the other of said inlet openings being adapted to be aligned with the second port when the valve body is turned, means adapted to supply wash water to the first port, and means adapted to successively supply hot water and steam to the second of said peripheral ports.

10. In a machine for washing receptacles, the combination of a valve plug having a first peripheral port through which wash water is adapted to be forced, said plug having a second peripheral port through which either hot rinse water or steam is adapted to be forced, said first port and said second part being respectively arranged at different heights in the said plug, a revoluble valve body mounted upon the said plug, said revoluble valve body having a pair of nozzles respectively provided with separate inlet openings, one of said inlet openings being adapted to be aligned with the first port and the other of said inlet openings being adapted to be aligned with the second port when the valve body is turned, means adapted to supply wash water to the first port, a mixer connected to the second port, a water supply pipe and a separate first steam supply pipe respectively connected to the said mixer, said water supply pipe and said first steam supply pipe being respectively provided with control valves, the connection between said mixer and said second port including a check valve adapted to permit fluid from the said mixer to pass to the said second port, a second steam supply pipe connected to the second port, said second steam supply pipe having a third control valve associated therewith, and control means connected to said revoluble body and turnable therewith, said control means being adapted to first simultaneously actuate the valves of the said water supply pipe and said first steam supply pipe so as to supply a mixture of water and steam to the mixer and to the second peripheral port, said control means being adapted to subsequently actuate the control valve of the second steam supply pipe to supply steam alone to said second peripheral port, a receptacle support connected to said revoluble body and adapted to carry a receptacle, and supplemental means connected to said control means and adapted to be operated by the mounting of a receptacle upon the support therefor to move the said control means to their operative position.

11. In a machine for washing receptacles, the sub-combination of a valve having a plug provided with a peripheral port, a revoluble body mounted upon the said plug and having a nozzle outwardly projecting therefrom, said revoluble body having an inlet opening adapted to be aligned with the said port when the valve body is turned, a receptacle support movable with the said valve body and adapted to carry the receptacle to be washed in alignment with said nozzle, a source of hot water connected to the said port and having first valve means, a source of steam connected to the said port and having second valve means, control means movable with said valve body and adapted to first open the first valve means and to subsequently open the second valve means in order to first supply the said port with hot water and then with steam, and supplemental means connected to the said control means and adapted to be actuated by the mounting of a receptacle upon the support therefor to move the said control means to operative position.

12. In a machine for washing receptacles, a valve having a plug provided with a peripheral port, a valve body revolubly mounted upon the said plug, and having a nozzle outwardly projecting therefrom, said valve body having an inlet opening adapted to be aligned with the said port when the said valve body is turned, a receptacle support adapted to turn with the said valve body and to carry a receptacle in alignment with the said nozzle, a casing surrounding the said valve body and the said support, a source of hot water connected to the said port and having first valve means, a source of steam connected to the said port and having second valve means, a first valve actuating member mounted in the inside of the said casing and connected to the first valve means, a second valve actuating member mounted in the inside of the said casing and connected to the second valve means to actuate the same and an auxiliary member movable with the said valve body and adapted to first actuate the first actuating member and to subsequently actuate the second actuating member, and supplemental means associated with said auxiliary member and adapted to move the said auxiliary member to operative position when a receptacle is mounted upon the support therefor.

13. A device according to claim 12 in which the first valve actuating member comprises an inner lever pivoted to the inside of the casing and the second actuating member comprises an outer lever pivotally connected to and in alignment with the first mentioned lever.

14. A device according to claim 12, said device having an outside rinsing head, said device also having an outside steaming head, said outside rinsing head being connected to said source of hot water, said outside steaming head being connected to said source of steam, said first valve means being adapted to control the supply of hot water to said outside rinsing head, said second valve means being adapted to control the supply of steam to said outside steaming head.

15. In a machine for washing receptacles, the sub-combination of a valve having a plug provided with superposed ports, a valve body revolubly mounted upon the said plug, said valve body having a plurality of series of nozzles outwardly projecting therefrom, each of said series of nozzles having inlet openings in said valve body adapted to be aligned with one of said ports, the consecutive nozzles being arranged in staggered relationship.

16. In a machine for washing receptacles, the sub-combination of a valve having a plug provided with a peripheral port in the lower portion thereof, said port being connected to a source of wash water, said plug also having a pair of superposed peripheral ports angularly spaced from said wash water port, supply pipes respectively connected to the said superposed ports to supply either rinsing water or steam thereto, a valve body revolubly mounted upon the said plug, said valve body having a plurality of series of upper nozzles outwardly projecting therefrom, each series of upper nozzles having inlet openings adapted to be respectively aligned with one of said superposed ports, the consecutive upper nozzles being arranged in staggered relationship, said valve body also having a plurality of series of lower nozzles having inlet openings adapted to be aligned with the said wash water port, the lower nozzles being arranged in staggered relationship, each of the upper nozzles being substantially vertically aligned with one of the lower nozzles.

17. In a machine for washing an object, a revoluble support adapted to carry said object, a valve comprising a fixed plug having a peripheral opening, a revoluble valve body mounted upon said plug, said revoluble valve body having an opening which is adapted to be aligned with said port, a nozzle connected to said revoluble valve body, the inner end of said nozzle being connected with the opening in said valve body, the outer end of said nozzle being adapted to deliver a fluid which passes through the same upon the object, a hot water mixer connected to said peripheral opening, a steam supply pipe and a water supply pipe connected to said mixer, and automatic control means adapted to cause said steam supply pipe and said water supply pipe to simultaneously deliver steam and water to said mixer and thence to said peripheral opening, and to then cause said steam supply pipe to be connected alone to said peripheral opening.

18. In a machine for washing a receptacle and the cover thereof, a revoluble support adapted to carry said receptacle in vertical position and to also carry said cover in substantially vertical position, said revoluble support moving in a fixed plane, a first outside washing head adapted to wash the outside of the receptacle, a second outside washing head adapted to wash the said cover, the second outside washing head being inclined to said plane rearwardly with respect to the direction of movement of said cover, said second outside washing head being mounted to deliver a stream of water which is directed toward the center of said support, and means adapted to supply wash water to both of said washing heads.

19. In a machine for washing objects, a revoluble support which is adapted to carry the object to be washed, a valve having a plug which is provided with a pair of peripheral ports which are located at different heights, means adapted to supply fluids at different temperatures to said ports, a revoluble valve body surrounding said plug and having separate and vertically spaced series of nozzles projecting therefrom, said nozzles being located and shaped so as to direct said fluids upon said objects, said revoluble valve body also having openings therein, said openings in the valve body being located at different heights so that they can be respectively aligned with said ports, each of said openings being connected with one of said nozzles, said ports being angularly spaced in the plug, so that they deliver fluids to their respective nozzles during different periods of time.

20. In a machine for washing objects, a revoluble support which is adapted to carry the object to be washed, a valve having a plug which is provided with a pair of peripheral ports which are located at different heights, means adapted to supply fluids at different temperatures to said ports, a revoluble valve body surrounding said plug and having separate and vertically spaced series of nozzles projecting therefrom, said nozzles being located and shaped so as to direct said fluids upon said objects, said revoluble valve body also having openings therein, said openings in the valve body being located at different heights so that they can be respectively aligned with said ports, each of said openings being connected with one of said nozzles, said ports being angularly spaced in the plug, so that they deliver fluids to their respective nozzles during different periods of time, and control means associated with one of said series of nozzles and adapted to control the contact of the fluid which issues from said nozzles with the objects to be washed.

IRA H. KENDALL.